United States Patent
Blevins

(10) Patent No.: US 8,541,894 B2
(45) Date of Patent: Sep. 24, 2013

(54) ELECTRICAL GENERATOR

(76) Inventor: Jerry Blevins, Toms Brook, VA (US)

( * ) Notice: Subject to any disclaimer, the term of this patent is extended or adjusted under 35 U.S.C. 154(b) by 264 days.

(21) Appl. No.: 12/949,072

(22) Filed: Nov. 18, 2010

(65) Prior Publication Data

US 2011/0115236 A1 May 19, 2011

Related U.S. Application Data

(60) Provisional application No. 61/272,918, filed on Nov. 19, 2009.

(51) Int. Cl.
*H02K 7/116* (2006.01)

(52) U.S. Cl.
USPC .............................. 290/1 R; 290/1 C; 290/3

(58) Field of Classification Search
None
See application file for complete search history.

(56) References Cited

U.S. PATENT DOCUMENTS

| | | | |
|---|---|---|---|
| 1,948,288 A | 2/1934 | Corey | |
| 3,921,741 A | 11/1975 | Garfinkle et al. | |
| 4,170,738 A * | 10/1979 | Smith | 290/42 |
| 4,321,837 A | 3/1982 | Grigsby | |
| 4,452,045 A | 6/1984 | Matlin et al. | |
| 4,480,966 A | 11/1984 | Smith | |
| 5,808,368 A | 9/1998 | Brown | |
| 6,109,029 A | 8/2000 | Vowles et al. | |
| 6,494,144 B1 * | 12/2002 | Perez Sanchez | 104/287 |
| 7,009,350 B1 | 3/2006 | Gold | |
| 7,315,092 B2 | 1/2008 | Cook | |
| 7,504,737 B2 | 3/2009 | Vasilovich et al. | |
| 7,709,970 B2 | 5/2010 | Blevins | |
| 2008/0188174 A1 * | 8/2008 | Aminpour et al. | 454/309 |

\* cited by examiner

*Primary Examiner* — Tulsidas C Patel
*Assistant Examiner* — Sean Gugger
(74) *Attorney, Agent, or Firm* — Welsh Flaxman & Gitler LLC

(57) ABSTRACT

An electrical generator powered by the rotation of a central shaft. A gear train rotates with respect to the central shaft and is in operable connection to a generator for producing electrical energy. The shaft can be rotated by falling weights connected to longitudinal arms. Alternatively, a motor can be used to rotate a relatively large wheel in operable connection with the series of gears or gear train. Additionally, the shaft can be rotated by a renewable energy source, such as wind or water.

6 Claims, 16 Drawing Sheets

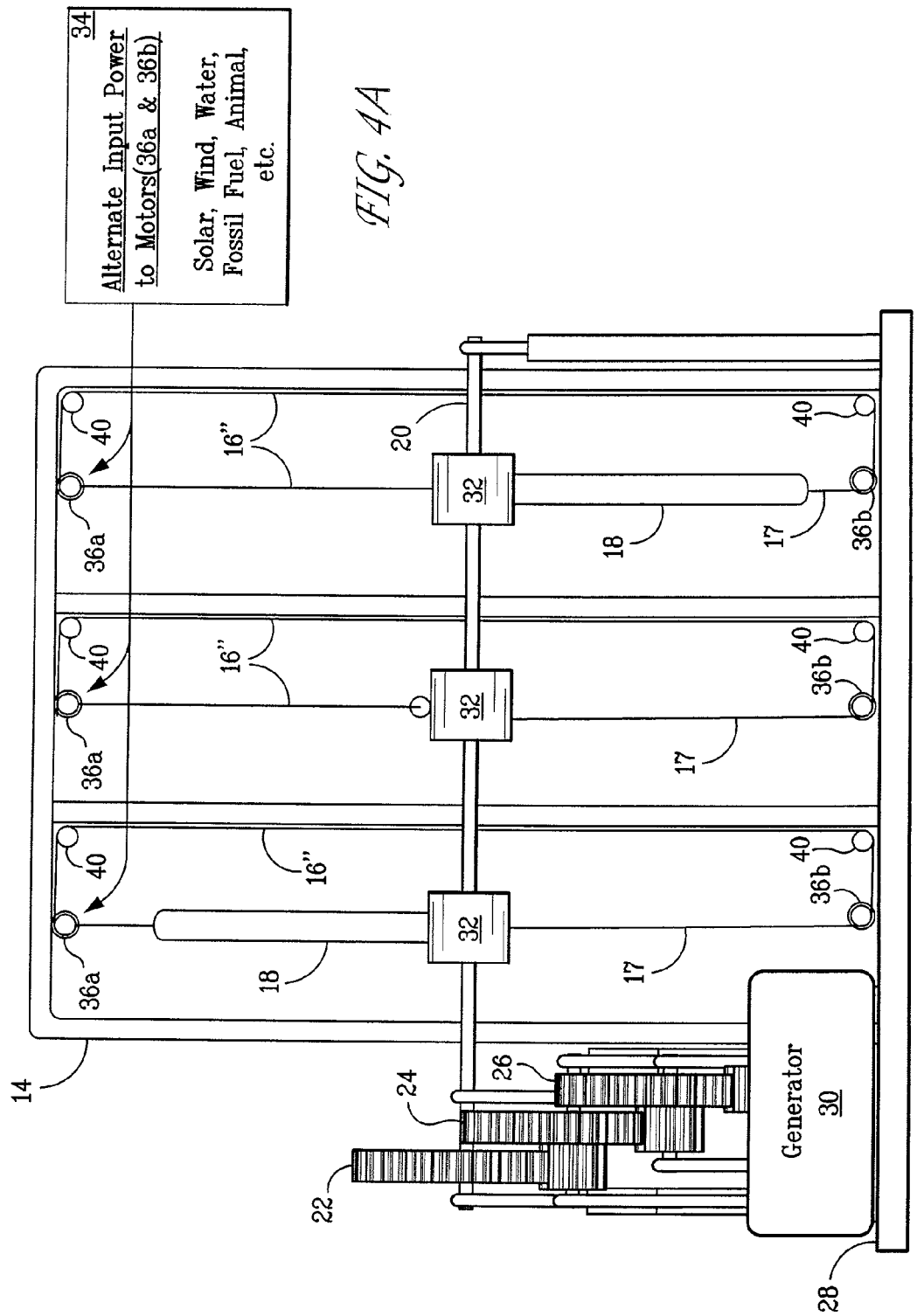

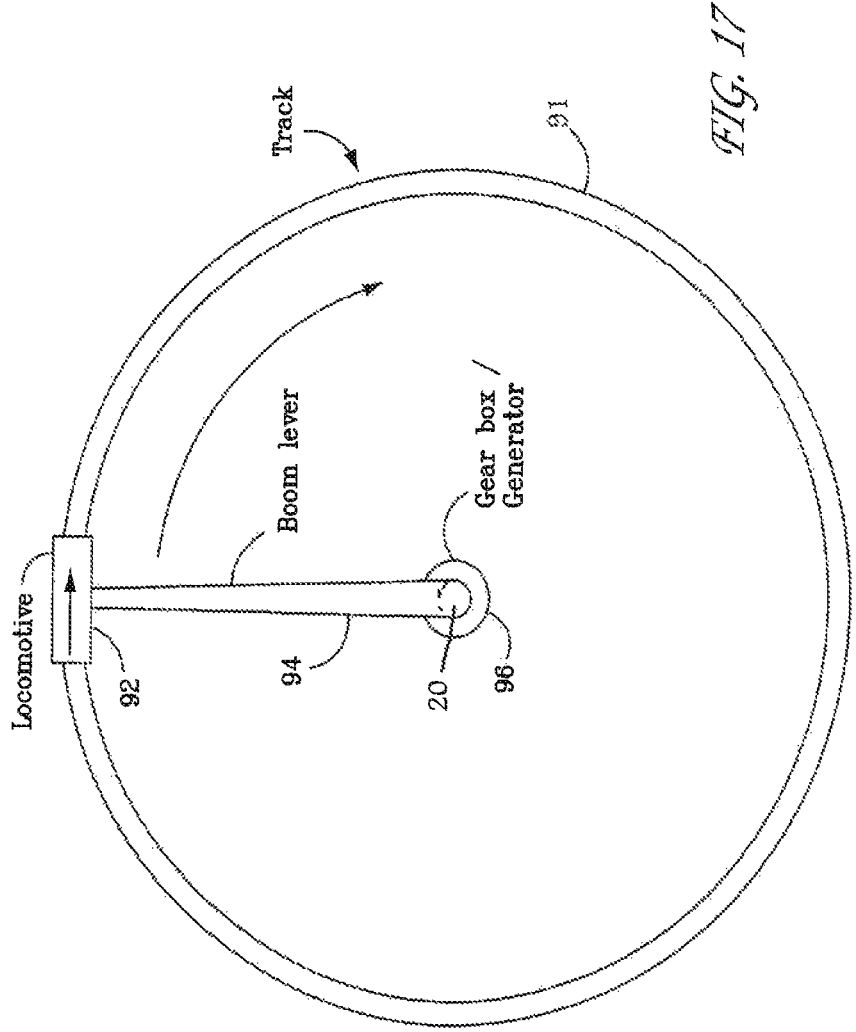

ELECTRICAL GENERATOR

CROSS-REFERENCE TO RELATED APPLICATION

This application claims the benefit of U.S. provisional patent application Ser. No. 61/272,918, filed Nov. 19, 2009.

FIELD OF THE INVENTION

The present invention is directed to an electrical generator.

BACKGROUND OF THE INVENTION

The generation and transmission of electrical power is a constant concern. Providing electrical power for the numerous needs of residential, commercial and industrial applications is a constant concern. These concerns include the noise and pollution associated with the generation of electricity and the problems in transmission over long distances.

SUMMARY OF THE INVENTION

In a first embodiment, an electrical generator utilizes power produced by falling weights. Falling weights are connected to long arms which turn a shaft. The shaft, through a series of gears, thereby rotates the poles/coils of the generator to produce electrical energy.

A second embodiment of the present invention utilizes a motor to cause the gears to rotate. This embodiment does not employ the falling weights or arms illustrated with respect to the first embodiment.

A third embodiment employs running water to power the series of gears.

A fourth embodiment utilizes wind power to power the series of gears.

A fifth embodiment shows the use of a gearing arrangement used in a motor vehicle.

A sixth embodiment would employ arms to rotate the shaft of a series of gears, but without the employment of falling weights.

A seventh embodiment would utilize a combined gear box and generator in a single housing.

An eighth embodiment would utilize a locomotive or similar vehicle such as a truck to power the series of gears.

BRIEF DESCRIPTION OF THE DRAWINGS

FIGS. 4A and 4B are end views of the electrical generator utilizing an alternate cabling structure;
FIG. 17 is a view showing the use of a locomotive to power a series of intermeshing gears to produce electricity for the electrical generator.

DETAILED DESCRIPTION OF THE INVENTION

Figure 1:
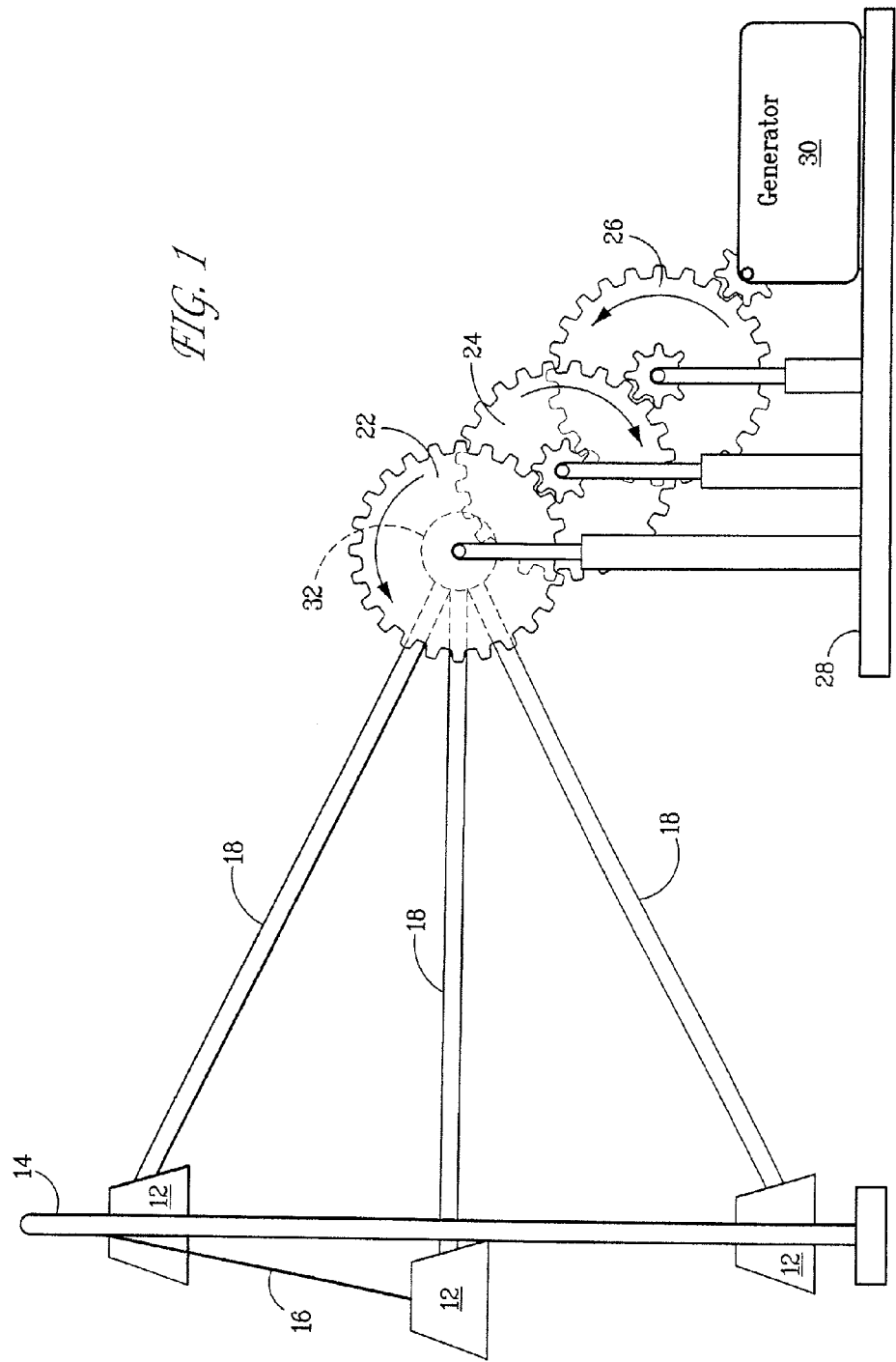
FIG. 1 is a side view of the electrical generator.

As described in U.S. Pat. No. 7,709,970 and incorporated herein by reference, a series of weights 12 are connected to a rack 14. While three weights are shown, any number of weights may be utilized. An arm 18 is provided between each weight 12 and a longitudinal shaft 20. The end of the arm 18 moves in an arc while the weight 12 moves in a line. To account for this difference, the arm 18 attaches to the weight in any suitable manner. The end of the arm 18 may attach to the weight by a cable or a rod pivotally connected to the weight, the arm, or both. Also, the arm may be made of telescoping sections, allowing the length of the arm to vary.

Figure 2:
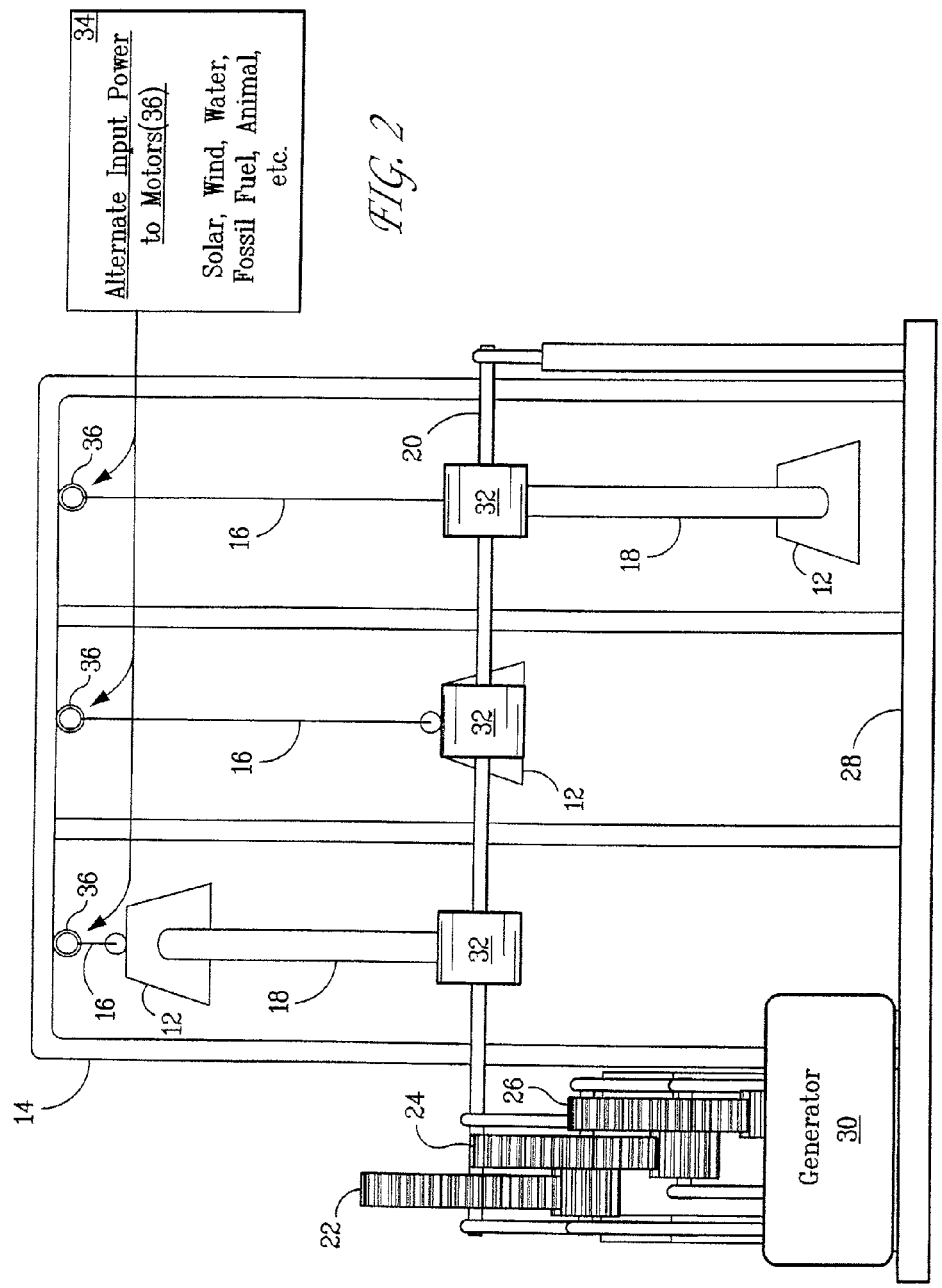
FIG. 2 is an end view of the electrical generator.
Figure 3:
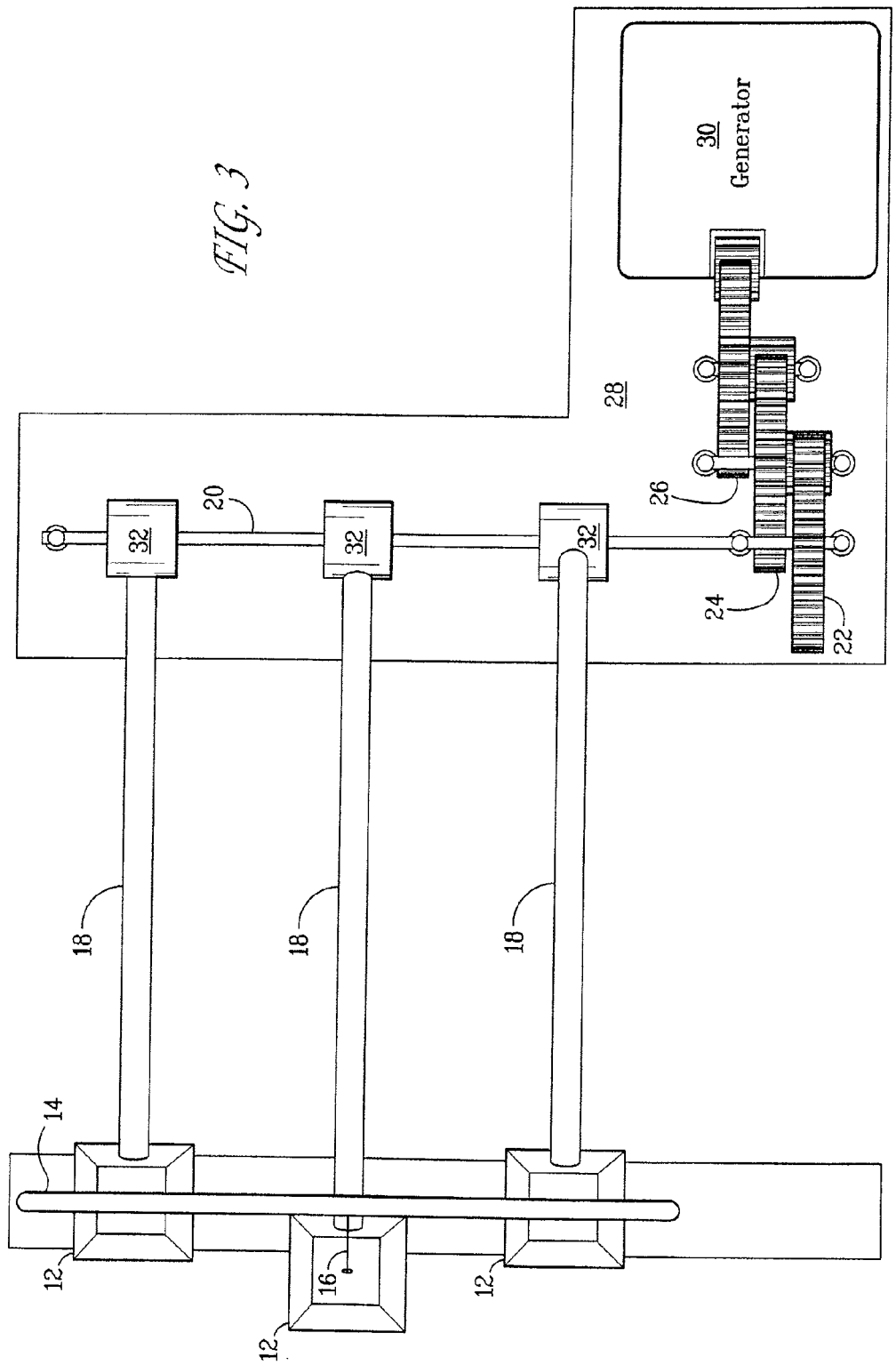
FIG. 3 is a top view of the electrical generator.

The shaft 20 is connected to a first gear 22. The first large gear 22 intermeshes with a second large gear 24, through the use of a compound gear, a small gear turning with the larger gears 22, 24. As the first gear 22 meshes with the smaller gear, an increase in rotational speed is gained. The larger gear 24 connects with a third larger gear 26 through the use of a smaller gear. The third gear set, likewise, is a compound gear having a small gear meshing with the larger of the second gear to again increase rotational speed. The larger gear 26 meshes with an electric generator 30 through the use of a smaller gear. Any number of gears may be used in the gear train between the shaft 20 and generator 30 in order to produce a desired rotational speed from the shaft. The gearing mechanism and the electric generator 30 are supported by a platform 28, as shown in FIGS. 1-3. The distance between the platform 28 and the rack 14 could be any desirable or feasible distance.

FIG. 2 illustrates the end view showing the relationship between the weights 12 as they are suspended from the rack 14 by a cable 16. After the weight 12 has reached its lowest position, it is raised back to the top of rack 14 by a secondary power source 34 such as, but not limited to solar power, wind power, fossil fuel, animal power used to power respective motors 36 to move each cable upwards, resulting in the upward movement of each of the weights 12. In the view of FIG. 2, one weight is shown in its uppermost position, a second weight is shown in its lowermost position, and a third weight is shown in a middle position. In order that the arms turn the shaft 20 on its downward journey but still be able to be raised, each arm 18 is connected to the shaft 20 by a ratcheted spline 32. The ratcheted feature allows the arms 18 to drive the shaft 20, yet still be raised without affecting movement of the shaft 20.

The weights 12 may be in any position at any given time, including all weights in its uppermost position. The weights may be raised during off-peak electrical usage time, allowing for the later generation of electricity during peak usage to reduce the strain on the electrical system. As previously described, the secondary power source may be powered by a renewable power source, such as hydropower, allowing for the conversion of hydropower to electricity, or solar powered, allowing for the raising of weights during power production of the solar panels and generation of electricity when the solar panels are not producing. The weights may also be raised manually, if the weights are of a size making this feasible.

FIG. 4A is in many respects similar to the invention illustrated in FIGS. 1-3, such as the use of the same gearing arrangement 22, 24 and 26. Each of the gears 22, 24, 26 generally has the same circumference. Smaller circumference gears inter mesh with gears 22, 24 and 26 as well as with moveable poles/coils in the generator 30. However, the weights attached to each arm are not included.

Figure 4B:
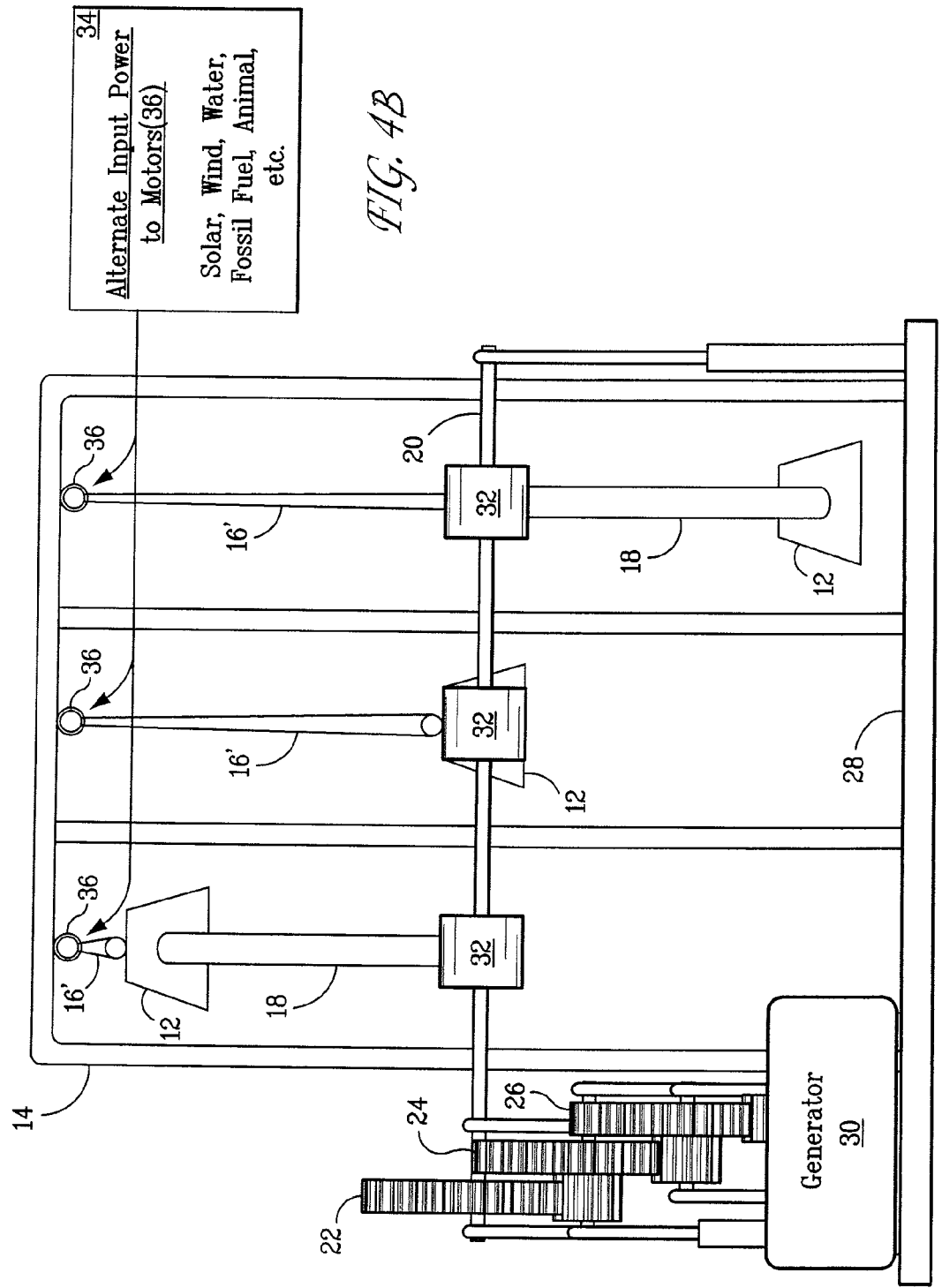

FIG. 4B shows the use of an alternate cabling configuration used to lift the arms 18 from the bottom of the rack 14 close to the platform 28 to an elevated position near the top of the rack 14. In this embodiment, a series of motors 36a is attached to the top of the platform 14, one motor 36a for each of the arms. Similar to the embodiment shown in FIG. 2, each of the motors 36a is powered by an alternate power source 34. Additionally, a series of motors 36b is provided near the bottom of the platform 28. These motors 36b are also powered by the alternate source of power. A cable arrangement 16" extends around pulleys 40 provided at the top and bottom of the rack 14. Additionally, a cable 17 would extend from the bottom of each arm 18 to each of the motors 36b. The motors 36a are used to assist the movement of each arm 18 from the bottom position to the top position. Motors 36b are used to assist in the arm 18 being moved from the upper position to the lower position. This is in contradistinction to the embodiments shown in FIG. 2 in which only gravity is utilized to move the weights 12 downward. Although motors 36a and 36b have been described as electrical motors, gas motors and diesel motors can also be employed.

FIG. 4B illustrates an embodiment in which a cabling system 16' is provided between motors 36 attached to the top of the rack 14 and the weight 12. While the embodiment shown in FIG. 2 shows a single cable moving upwardly or downwardly, the cable 16' would move between two pulleys, the first of which is associated with the motor 36 and the second of which is attached to the top of each weight 12.

Figure 5:
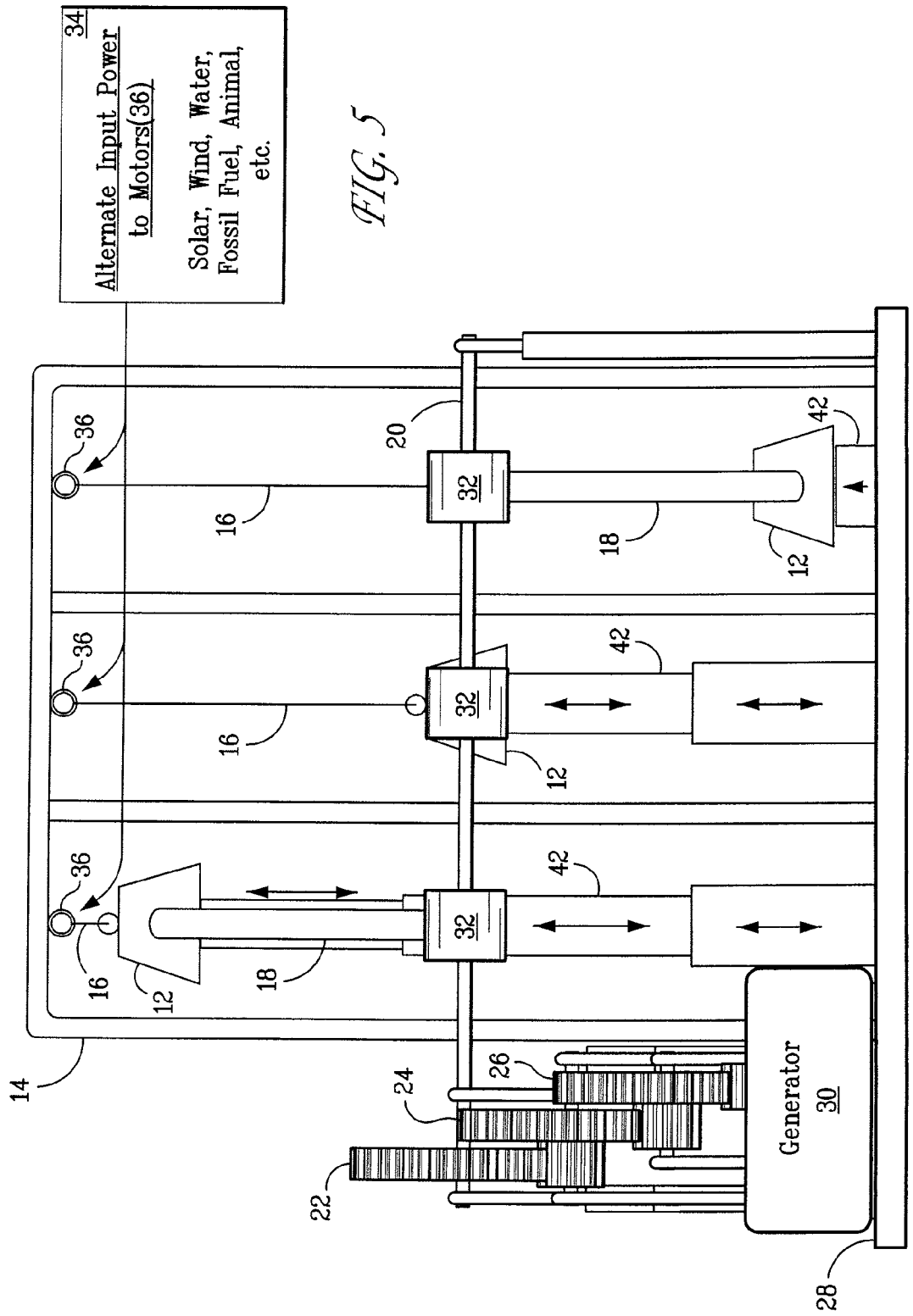
FIG. 5 is an alternate end view of the present invention utilizing a hydraulic lift.

FIG. 5 shows an alternative to the invention illustrated in FIG. 2 in which a series of pistons 42 are employed to assist in the up and down movement of the weights 12. The motors 36 in conjunction with the cables 16 would assist the piston in lifting and lowering the weights 12.

Figure 6:
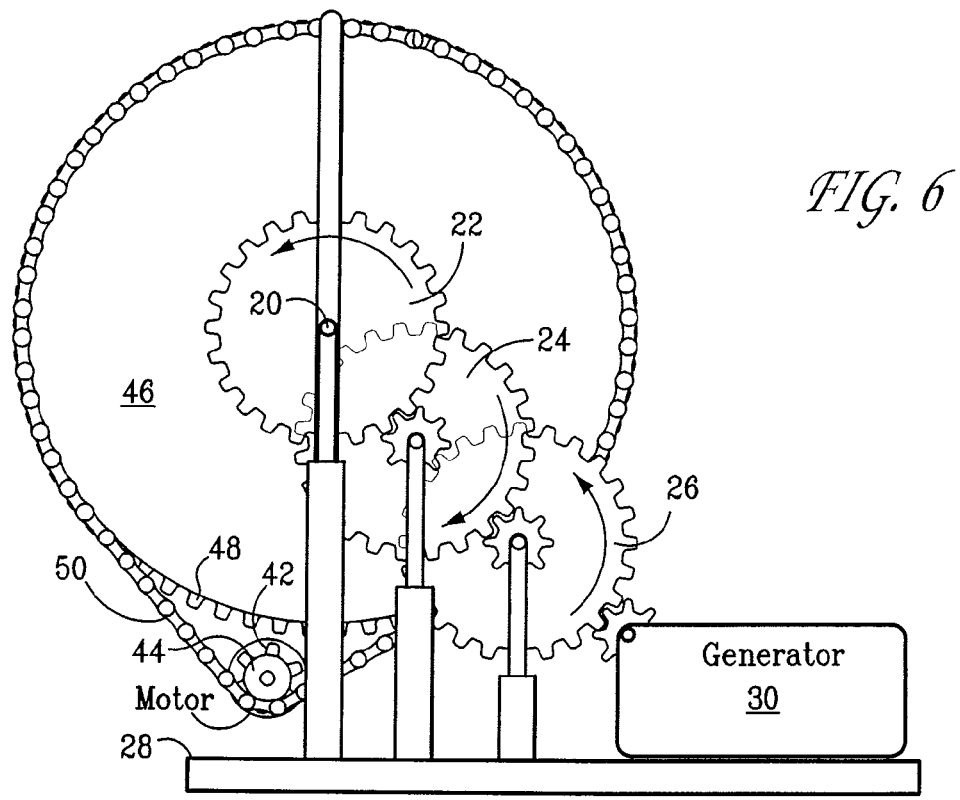
FIGS. 6, 7 and 8 are side views of the present invention utilizing a motor to power a series of intermeshing gears.
Figure 7:
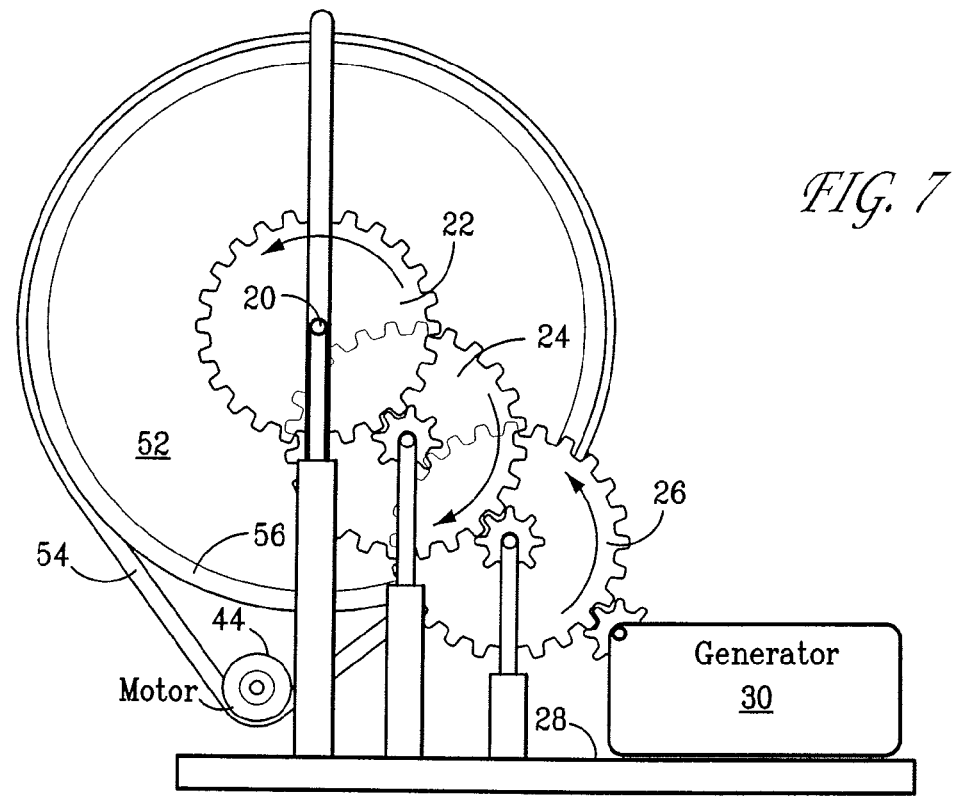
Figure 8:
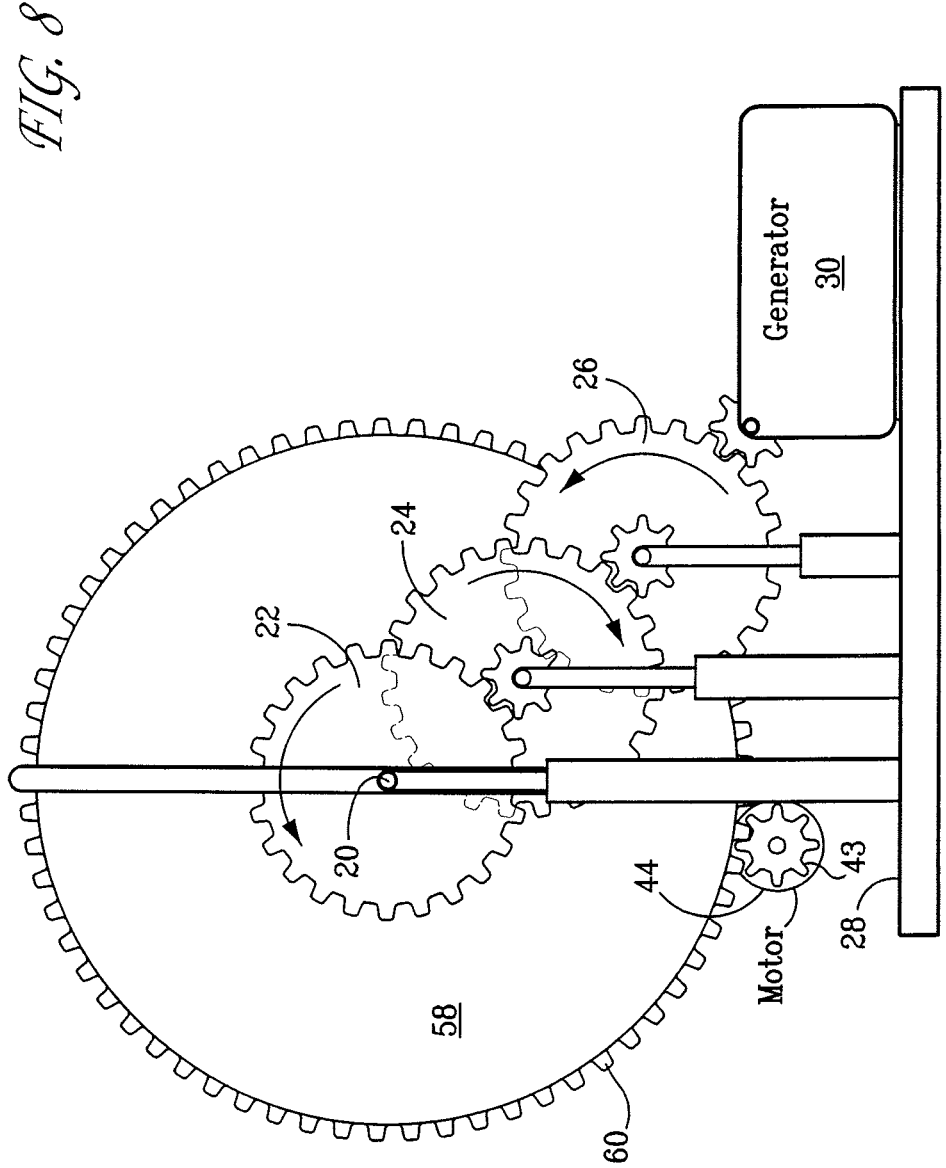

FIGS. 6, 7 and 8 describe an embodiment for producing electricity in the generator 30 without the inclusion of the weights 12, rack 14 and arm 18 used to rotate the shaft 20 as illustrated in the previous figures. For example, FIG. 6 utilizes a chain drive to rotate the shaft 20 which in turn would drive the gear train including gears 22, 24 and 26. FIG. 6 employs a motor 44 cooperating with a chain drive 50. Rotatable teeth 41 provided on the exterior of the rotating motor 44 cooperates with the teeth 48 of the chain drive 50 allowing a wheel 46 to rotate. Since the shaft 20 extends to the center of the wheel 46 and is frictionally associated therewith, the rotation of the wheel 46 will result in the rotation of the shaft 20 and a gear train 22, 24, and 26, the rotation of which would produce electricity in the generator 30.

Similarly, FIG. 7 shows use of the motor 44 cooperating with a rotatable belt 54. A wheel 52 would have a groove surrounding its entire periphery 56 which would cooperate with the movement of the belt 54 to cause the shaft 20 as well as the gear train 22, 24 and 26 to rotate in a manner similar to the rotation of the shaft 20 shown in FIG. 6.

FIG. 8 illustrates the use of a rotating motor 44 provided with teeth 43 thereon. These teeth cooperate with teeth 60 provided on the periphery of a wheel 58. Similar to the embodiments shown in FIGS. 6 and 7, the rotation of the motor 44 would cause the wheel 58 to rotate thereby resulting in the rotation of the shaft 20. The rotation of the shaft 20 would produce the rotation of the gear train 22, 24 and 26 thereby producing electricity in the generator 30.

Figure 9:
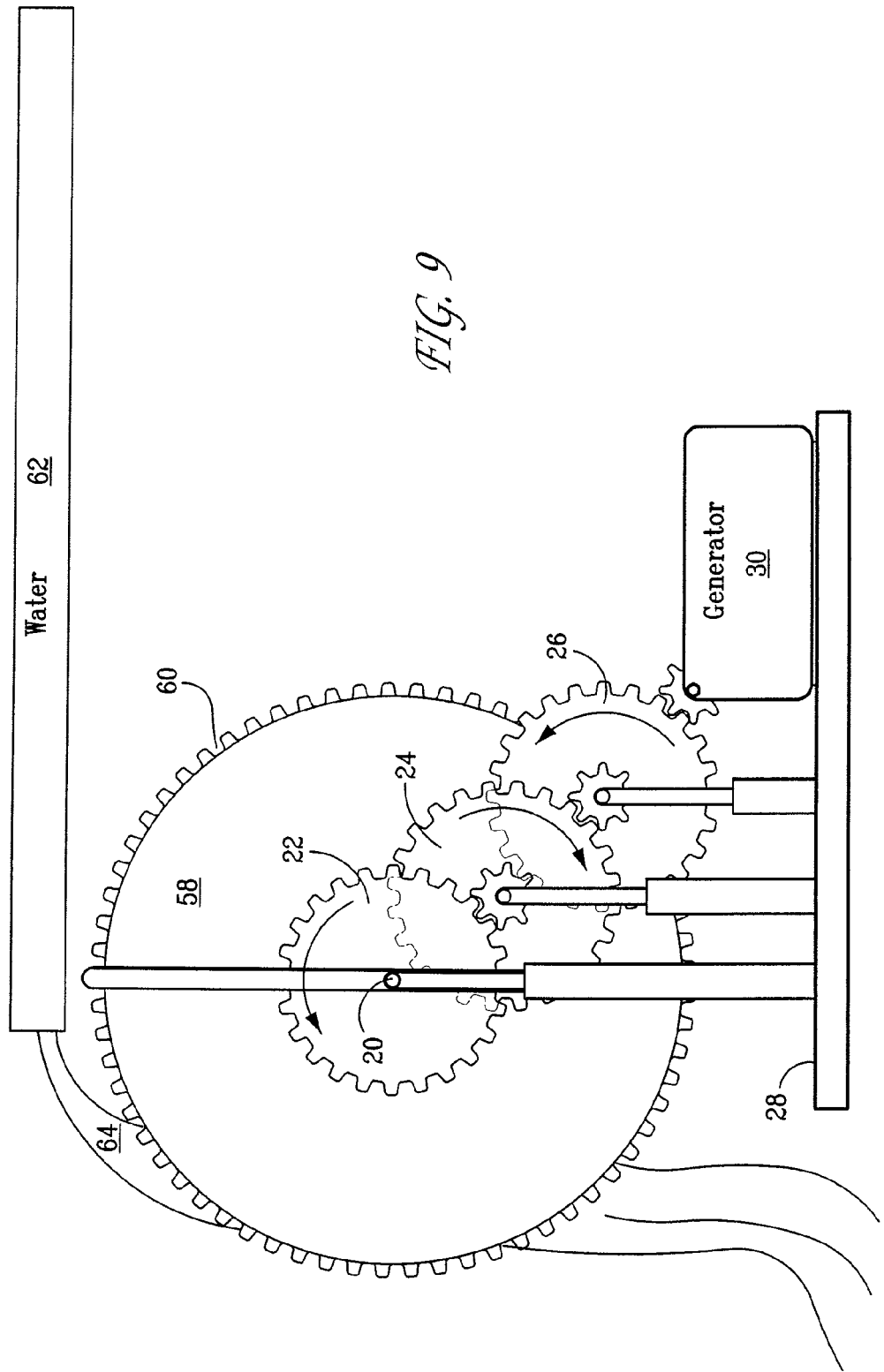
FIG. 9 is a side view of a water powered embodiment of the present invention.

FIG. 9 illustrates an embodiment in which the wheel 58 having teeth 60 along its periphery is rotated utilizing a flowing fluid such as water 64 flowing from a source 62. Similar to the embodiment shown with respect to FIG. 8, the rotation of the wheel 58 would result in the rotation of the shaft 20, thereby rotating the gear train 22, 24 and 26 to produce electricity in the generator 30. Due to the use of the flowing fluid 64, this embodiment can be mounted only vertically.

Figure 10:
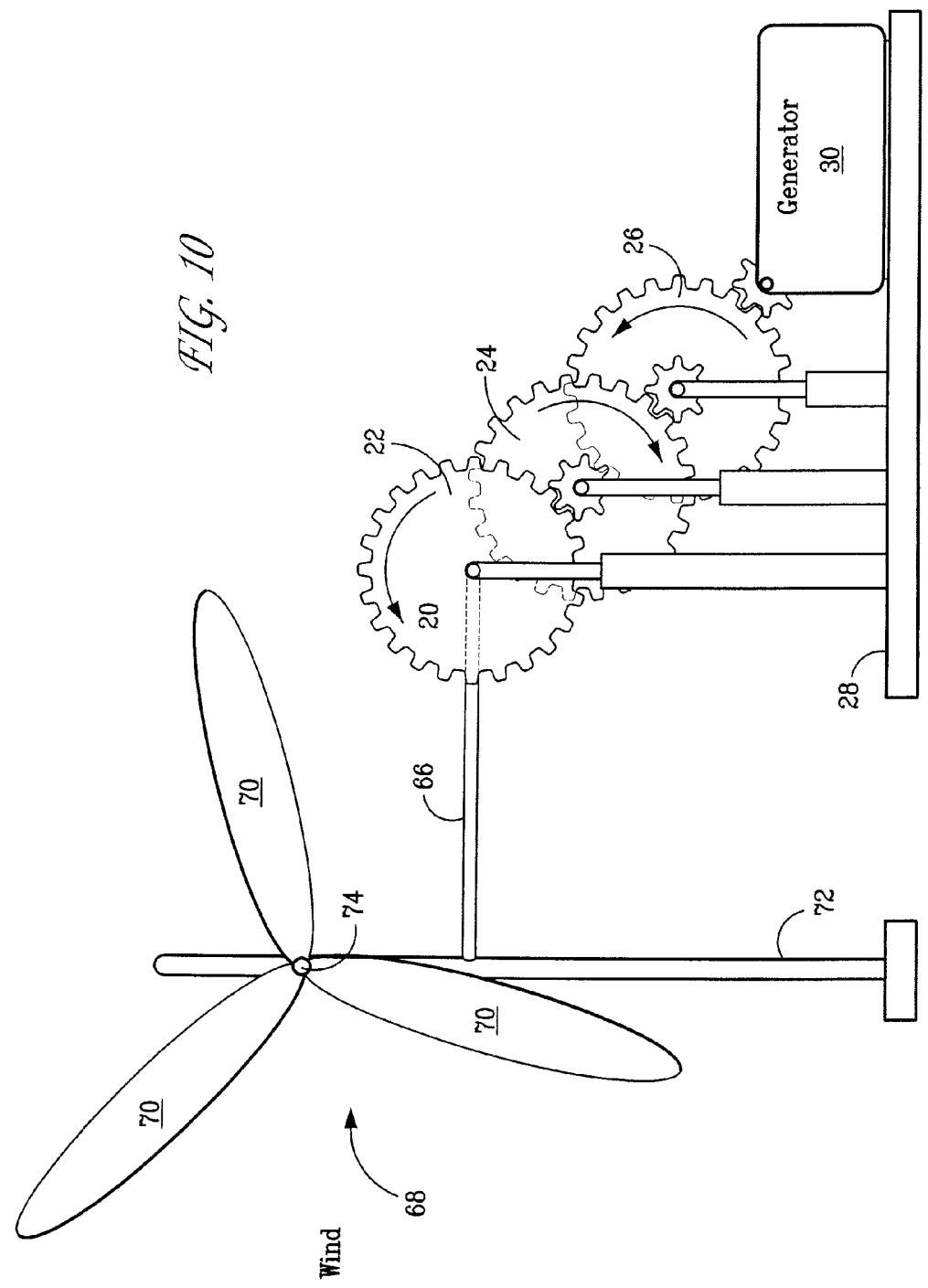
FIG. 10 is a side view of a wind power embodiment of the present invention.

FIG. 10 illustrates an embodiment utilizing wind power to rotate the shaft 20. A wind turbine 68 including a plurality of rotating blades 70 is rotatably affixed to a stand 72. The rotation of the blades 70 would result in the rotation of a shaft 74. The rotation of the shaft 74 is translated to the rotation of a shaft 66 provided between the stand 72 and shaft 20. Similar to the previous embodiments, the rotation of the shaft 20 results in the rotation of the gear train 22, 24, 26 thereby producing electrical energy in the generator 30.

Figure 11:
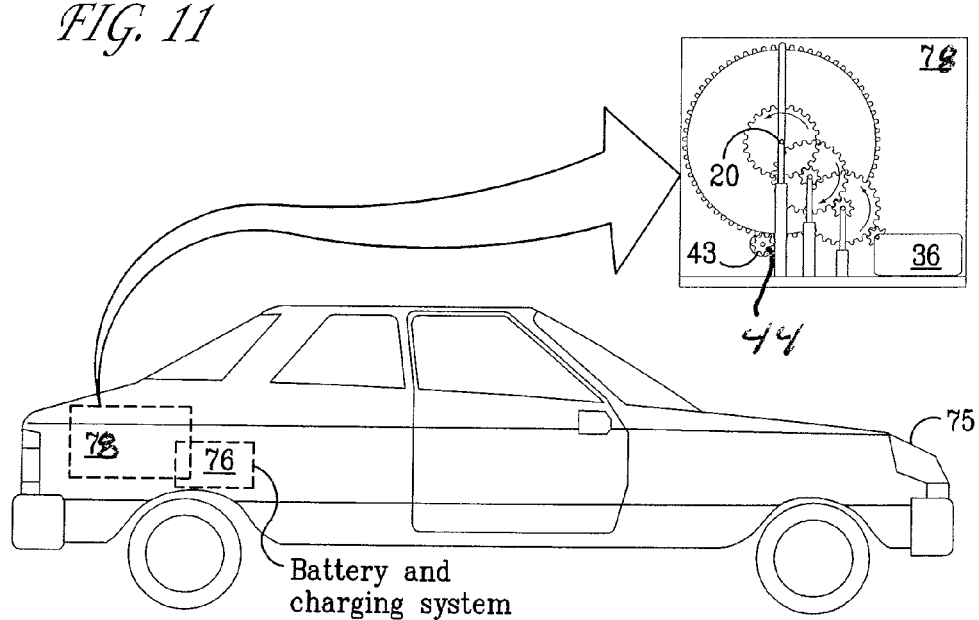
FIGS. 11 and 12 show the use of a gearing arrangement to power an automobile.

FIG. 11 illustrates the manner in which electricity can be generated to be used with respect to an automobile. The configuration 74 which is also shown in FIG. 8 is provided in the vehicle 75. A motor 44 having teeth 43 is powered to rotate the shaft 20 which would then be utilized to produce electrical energy in a generator 36. The generator 36 is in turn connected to the battery and charging system 76 of the vehicle, thereby storing the energy produced by the generator 36.

Figure 12:
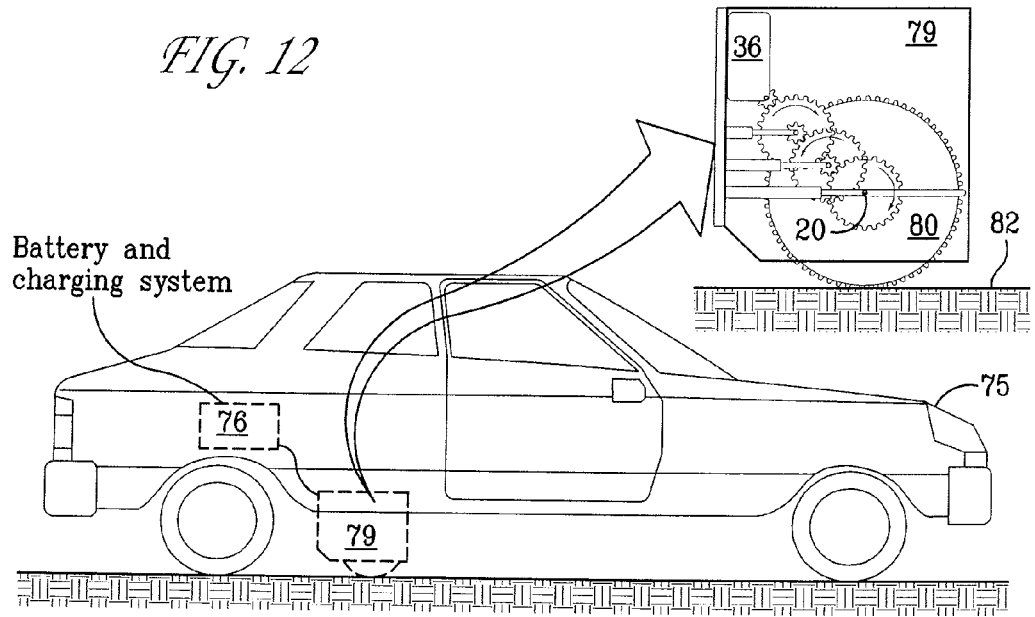
Figure 13:
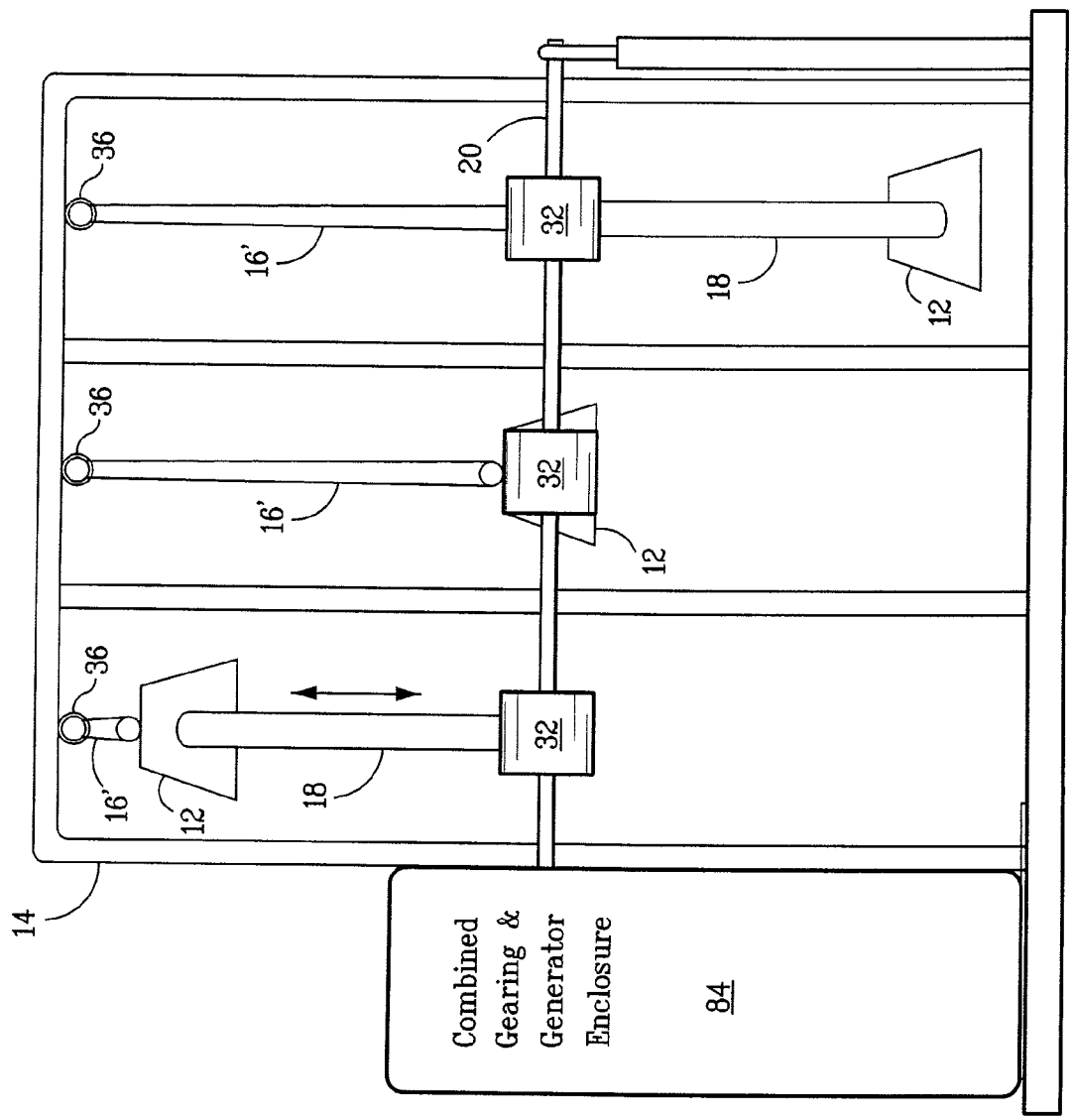
FIGS. 13-16 are end views of the present invention showing the position of a series of intermeshing gears and a generator.

The embodiment illustrated with respect to FIG. 12 includes a configuration 79 resulting in the rotation of the shaft 20, thereby rotating the gearing train as previously described. The rotation of shaft 20 is produced by the rotation of a toothed wheel 80 rotating as the vehicle 75 is driven over a road surface 82. The rotation of the wheel 80 will result in the rotation of the shaft 20, the gear train described with respect to the present invention as well as then producing electricity in the generator 30. This system 79 is in electrical connection with the battery and charging system 76.

FIGS. 13-16 illustrate the manner in which a combined generator and gearing box can be provided with any of the embodiments provided with the rising and falling weights 12 connected to arm 18 which is in turn connected to the rotatable shaft 20. For example, FIG. 13 employs a combined gearing and generator enclosure 84 in which, for example, the gearing arrangement shown in FIG. 2 is provided within the same enclosure as the generator.

Figure 14:
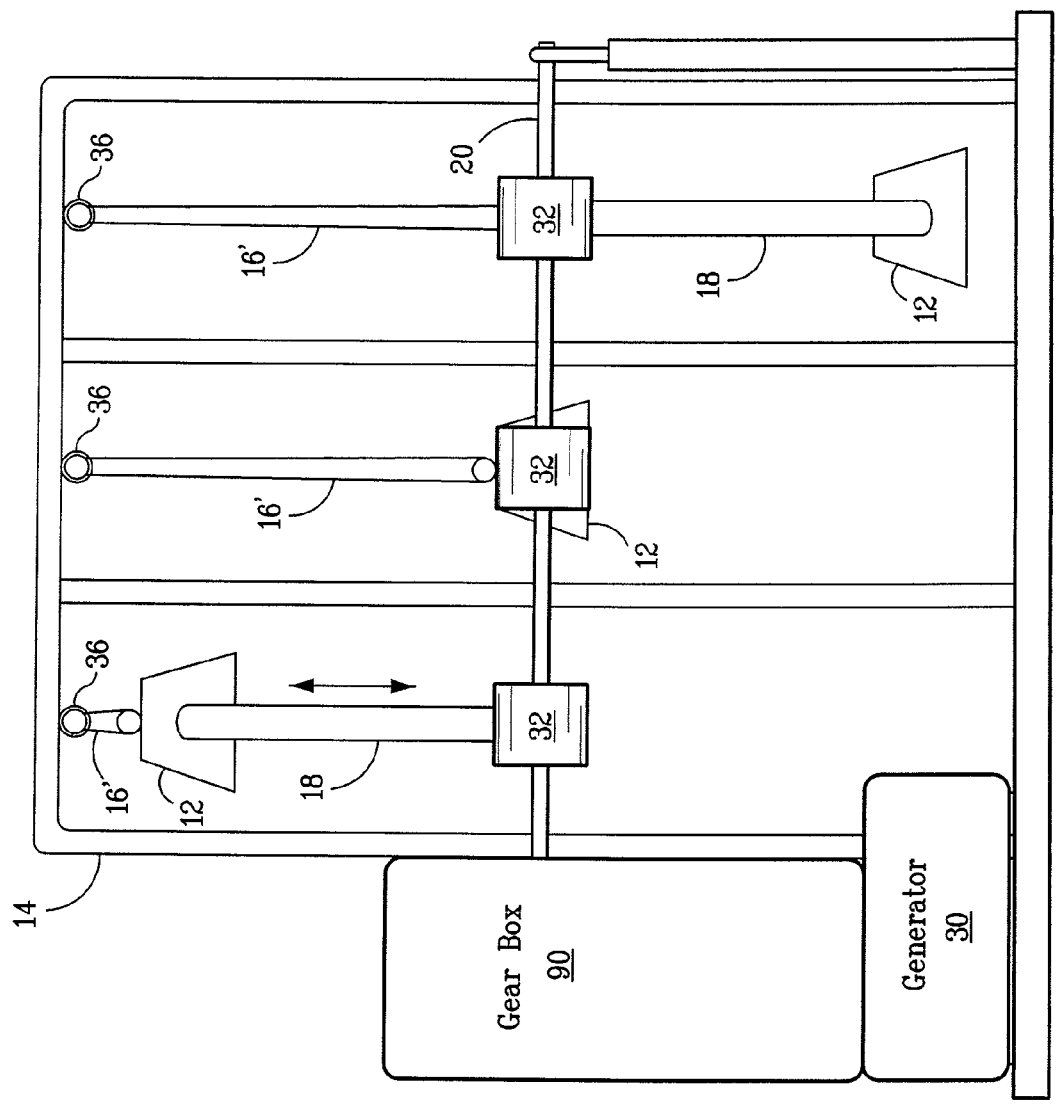

FIG. 14 illustrates an embodiment in which a gear box 90 is provided in a separate enclosure than the generator 30.

Figure 15:
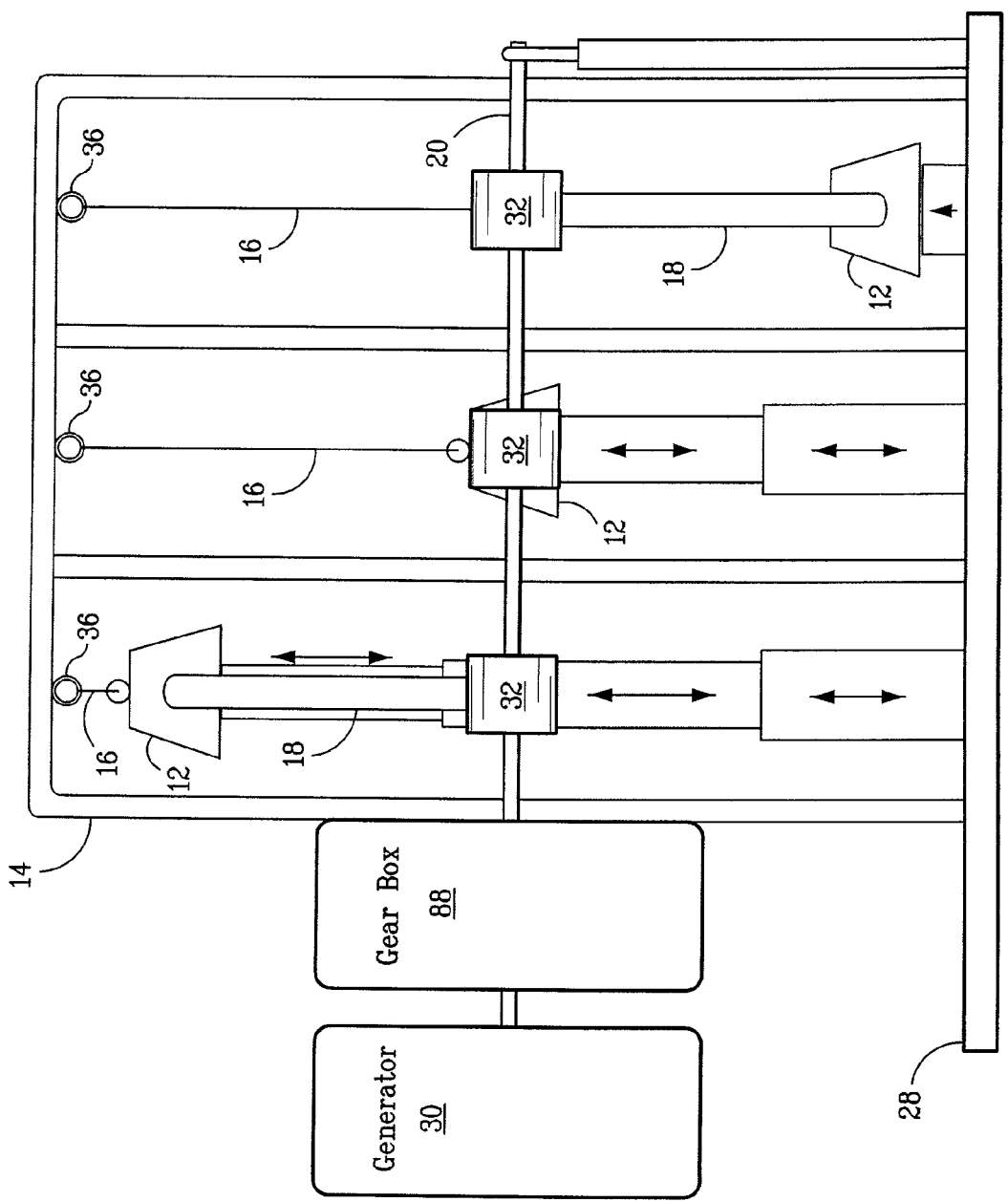
Figure 16:
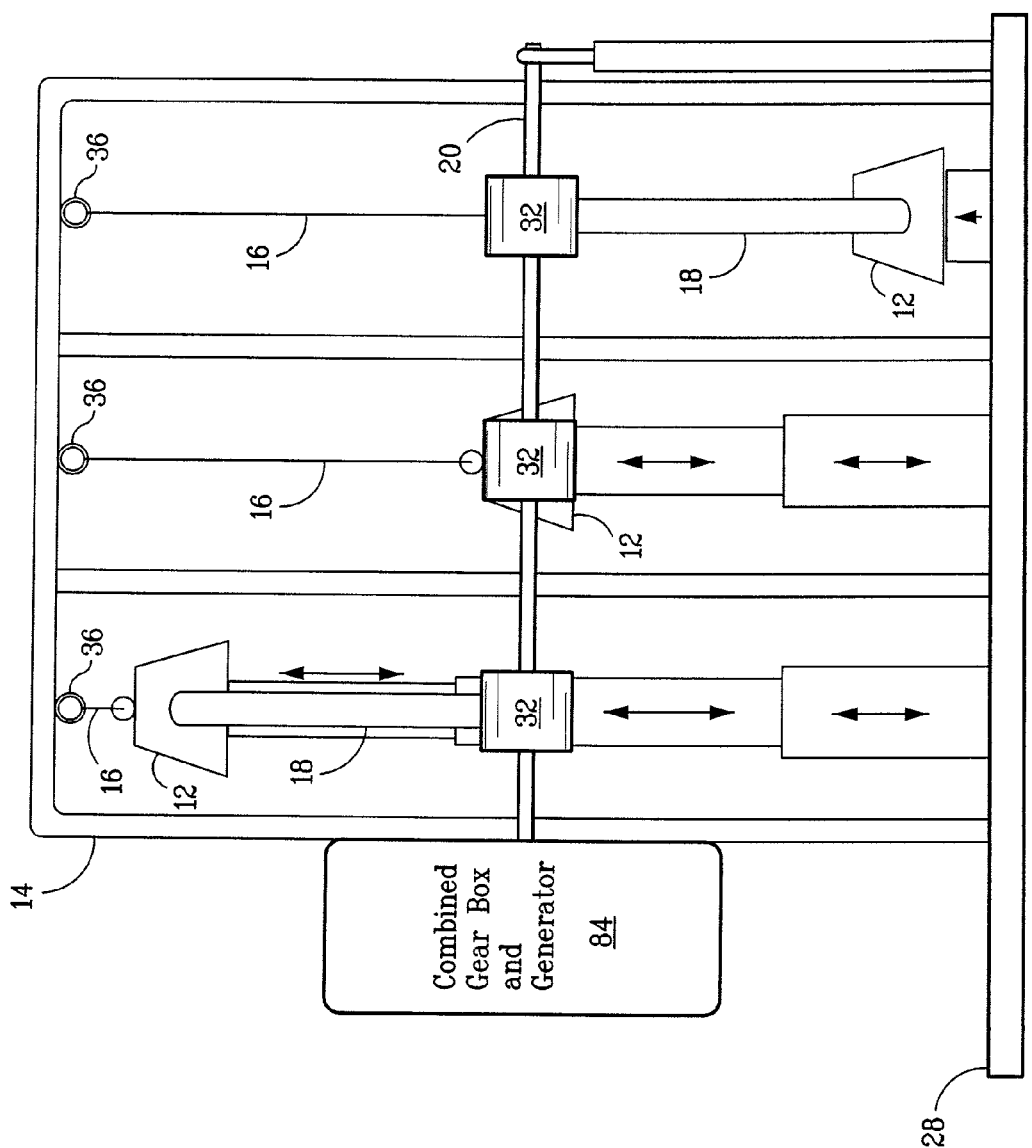

FIGS. 15 and 16 illustrate embodiments in which the hydraulic lift of FIG. 5 is provided with a separate enclosure for the generator 30 as well as for the gear box 88. FIG. 16 illustrates the hydraulic lift embodiment provided with a combined gear box and generator enclosure 84. It is important to note that the type of generator 30 which is employed would affect the configuration of the device for rotating a shaft within the generator 30. Certainly, the more poles or coils that are provided within the generator 30 the less speed of the rotation of that shaft is required to produce electricity. For example, a two pole/coil generator/alternator would rotate the shaft at 3600 rpm's, wherein a four pole/coil generator/alternator would rotate the shaft at 1800 rpm's. The poles and winding generator can be increased in numbers to reduce the revolutions of the shaft as previously described. For example, 100 pairs of poles/coils would reduce the rpm of the shaft one or more rpm. Additionally, as one increases the pole/coil number, fewer gears would be required. Furthermore, the generator would operate using one or three phases. However, other numbers of phases could also be used.

FIG. 17 illustrates an embodiment in which a locomotive 92 running on a circular track 91 produces electricity in a gear box/generator 96. The movement of the locomotive 92 on the track 91 forces a boom lever 94 to rotate. The boom lever 94 is connected to any one of the gear trains previously described thereby providing electrical energy to a generator. Although a locomotive 92 is shown in FIG. 17, it can be appreciated that any moving vehicle on a track with the vehicle connected to a boom lever which is in turn connected to the gear box/generator 96 would produce the energy.

As is true with respect to the previously described gear train configuration, the generator 30 would generally use a single phase or three phase system. A single phase system would produce one (1) horsepower and a three phase system would produce 1.72 horsepower.

While the invention has been disclosed with reference to preferred embodiments, variations and modifications would be apparent to one of ordinary skill in the art. Such variations and modifications are encompassed by the present invention.

The invention claimed is:

1. A device for producing electrical energy, comprising:
   an electrical generator provided with a plurality of poles and coils, and a first rotatable shaft;
   a gear train including a plurality of intermeshing gears, a first of said gears in rotational communication with said first rotating shaft of said electrical generator;
   a lever connected to said first rotating shaft; and
   a vehicle directly pushing said lever along a circular track and thereby causing rotation of said gear train, the rotation of said first rotating shaft transferred to said electrical generator by the rotation of said gear train to produce electrical energy;
   wherein the speed of rotation of said first rotating shaft is a function of the number of poles and coils provided in said electrical generator.

2. The device in accordance with claim 1, wherein said electrical generator is provided with two poles/coils, thereby requiring a rotation speed of said first rotating shaft to be 3600 rpm.

3. The device in accordance with claim 1, wherein said electrical generator is provided with four poles/coils, thereby requiring a rotation speed of said first rotating shaft to be 1800 rpm.

4. The device in accordance with claim 1, wherein said electrical generator is provided with 100 poles/coils, thereby requiring a rotation speed of said first rotating shaft of at least one rpm.

5. The device in accordance with claim 1, wherein said vehicle is moving along a circular track, and further wherein said electrical generator is surrounded by said circular track.

6. The device in accordance with claim 5, wherein said vehicle is a locomotive.

\* \* \* \* \*